Patented Oct. 16, 1951

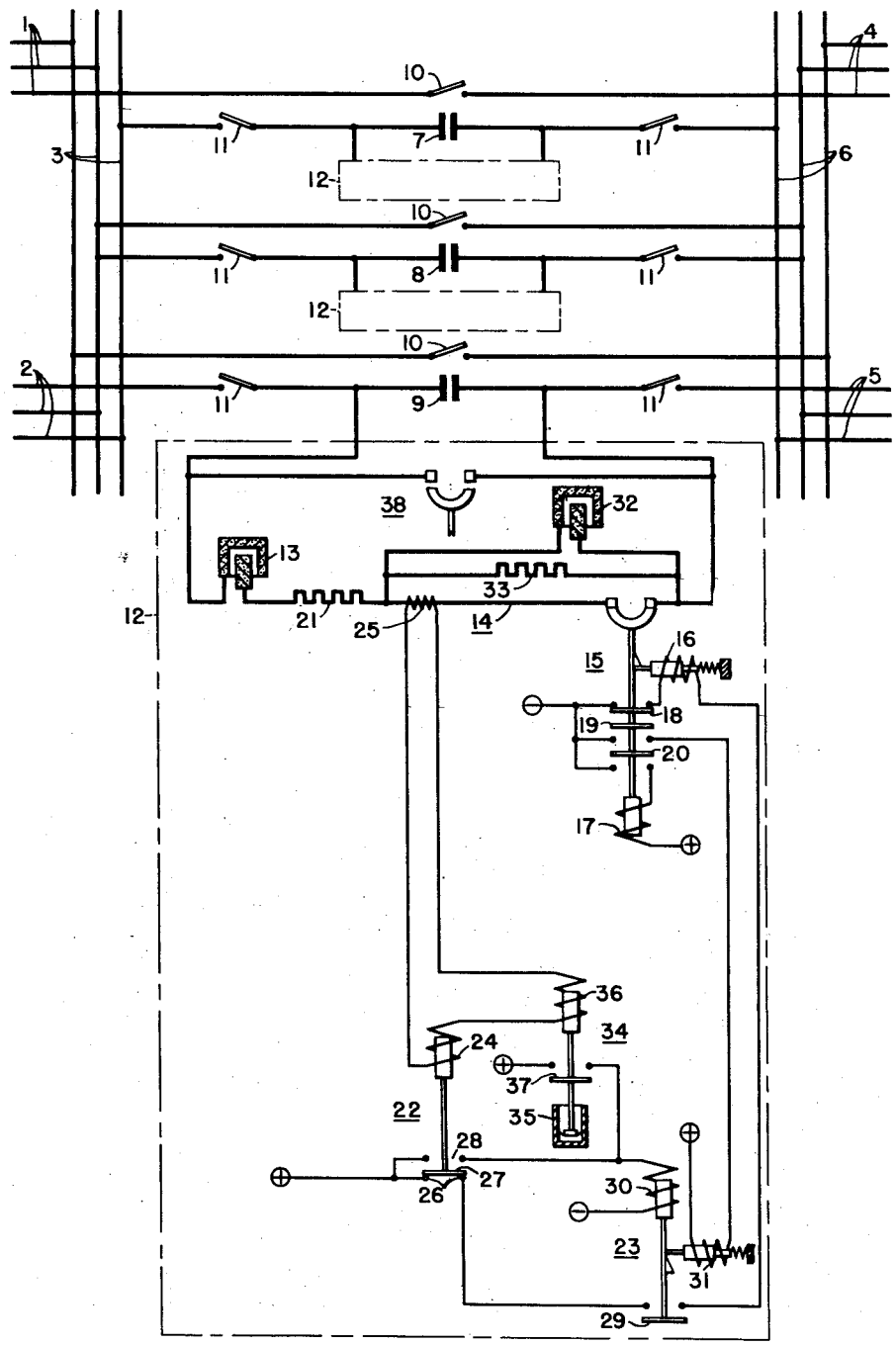

2,571,910

UNITED STATES PATENT OFFICE 2,571,910

PROTECTIVE SYSTEM FOR SERIES CAPACITORS

Ralph E. Marbury and Henry A. Travers, Pittsburgh, Pa., assignors to Westinghouse Electric Corporation, East Pittsburgh, Pa., a corporation of Pennsylvania Application August 19, 1948, Serial No. 45,015

6 Claims. (Cl. 175—294)

The present invention relates to the protection of series capacitors in alternating current lines and, more particularly, to a series capacitor installation for high-voltage synchronous transmission systems in which system stability is a primary, or limiting, consideration in the operation of the system.

Capacitors are connected in series in alternating current distribution and transmission lines to neutralize part or all of the inductive reactance of the line, in order to improve the voltage regulation or to raise the stability limit, or power limit, of the line. Since the capacitor is in series with the line and carries the line current, the voltage across the capacitor is proportional to the line current, and under fault conditions, or other excess-current conditions, the voltage across the capacitor may rise to many times its normal value. Standard capacitor units can safey be subjected to voltages of the order of 150% of the normal voltage for brief periods, but cannot be subjected to voltages in excess of 200% of the normal voltage, even momentarily, without the probability of damage. It is not economically practical to use capacitors which are capable of withstanding the maximum voltage to which they may be subjected under fault conditions, since the cost of a capacitor increases approximately as the square of the voltage for which it is insulated. It is necessary, therefore, to provide protective means for series capacitors which will by-pass the capacitor substantially instantaneously upon the occurrence of a fault, that is, in the first half-cycle of fault current. Because of this requirement of substantially instantaneous operation, spark gaps are usually used for protection of series capacitors, the gap being connected across the capacitor so as to by-pass it immediately upon the occurrence of a voltage in excess of the value for which the gap is set.

The protective systems used with series capacitors which are connected in distribution lines, for the primary purpose of improving the voltage regulation, usually include a switch or contactor for by-passing both the gap and the capacitor as soon as the gap has broken down, to extinguish the arc in the gap and to relieve it from the heating caused by continued arcing. The switch is opened to restore the capacitor to service when the current has fallen below a predetermined value, or after the lapse of a time interval which is long enough to permit the fault to be cleared. This type of protective system is entirely satisfactory for series capacitors in distribution lines where the primary purpose is to improve the voltage regulation, and there is no necessity for rapid restoration of the capacitor to service after a fault.

When series capacitors are used in high-voltage synchronous transmission systems, however, where system stability is a primary or limiting consideration in the operation of the system, and where the series capacitor is installed for the primary purpose of raising the stability limit, to increase the amount of power that can be transmitted over the line, the problem of providing a satisfactory protective system is much more difficult. The capacitor must be by-passed substantially intantaneously upon the occurrence of a fault, as explained above, and it is therefore removed from the line during fault conditions when the stability problem is most acute. For this reason, the protective system used with the series capacitor must operate to restore the capacitor to service very rapidly after the fault is cleared, that is, within a few cycles, so that the capacitor will be available to assist in maintaining stability during the critical transient conditions immediately following the fault. The difficulty involved in restoring the capacitor to service immediately after a fault is cleared, with sufficient speed to make the capacitor available at the time it is most needed, has been the chief factor which has retarded the application of series capacitors to high-voltage synchronous transmission systems, although the benefits of series capacitors in such systems have long been realized.

The principal object of the present invention is to provide a series capacitor installation for high-voltage alternating current synchronous transmission systems, in which the capacitor is by-passed substantially instantaneously under fault conditions, or other excess-current conditions, and in which the capacitor is restored to service very rapidly following the clearing of the fault, so as to be available for maintaining stability during the critical period immediately following the fault.

Another object of the invention is to provide a protective system for series capacitors which by-passes the capacitor substantially instantaneously under excess-current conditions, and which restores the capacitor to service, within a few cycles after the current has fallen below a predetermined value.

A further object of the invention is to provide a protective system for series capacitors which utilizes a gap device to by-pass the capacitor under excess-current conditions, and a current-interrupting means in series with the gap to interrupt the by-pass circuit and restore the capacitor to service very rapidly when the current has decreased to a predetermined value.

More specifically, the invention provides a protective system for series capacitors which includes a spark gap device and a normally closed circuit breaker connected in series in a by-pass circuit around the capacitor, so that the gap will break down and protect the capacitor substantially instantaneously under excess-current conditions. The system also includes relay means for establishing a tripping circuit for the circuit breaker as soon as the gap breaks down and fault current flows in the by-pass circuit, and for completing the tripping circuit to open the breaker as soon as the current in the by-pass circuit has fallen below a predetermined value, thus interrupting the by-pass circuit and restoring the capacitor to service very rapidly after the fault is cleared. The circuit breaker is immediately reclosed after operation, to again connect the spark gap device across the capacitor, and an auxiliary spark gap device is connected across the circuit breaker to provide protection for the capacitor in case a second fault occurs during the short time that the breaker is open. Preferably, additional slower-acting relay means are also provided to effect tripping of the breaker if the main spark gap device should arc over on a momentary voltage surge under normal current conditions which would not actuate the first-mentioned relay means.

Other objects and advantages of the invention will be apparent from the following detailed description, taken in connection with the accompanying drawing, the single figure of which is a schematic diagram showing a preferred embodiment of the invention.

The protective system of the present invention is shown in the drawing embodied in a series capacitor installation in a three-phase two-circuit, high-voltage, alternating current synchronous transmission system. The series capacitor is shown as being connected in the system at an intermediate station between the parallel line sections 1 and 2, which are connected to a station bus 3, and the parallel line sections 4 and 5, which are connected to a station bus 6. The capacitors 7, 8 and 9 are connected between the corresponding phases of the buses 3 and 6, so that they are connected in series in the line. Each of the capacitors is provided with a by-pass disconnecting switch 10, and isolating disconnecting switches 11, so that the capacitors can be by-passed and isolated from the line to permit inspection and maintenance of the capacitors with safety. The capacitors 7, 8 and 9 are shown diagrammatically as single capacitors, but it will be understood that in an actual installation each of them will comprise a relatively large number of individual capacitor units connected in parallel, or series-parallel, to provide the necessary capacitive reactance to cancel all, or at least a substantial part, of the inductive reactance of the line.

Since the capacitors 7, 8 and 9 are connected in series in the line, they must be protected against over-voltage under fault conditions, or other excess-current conditions, as explained above, and for this purpose, each capacitor is provided with a protective system 12. The protective systems 12 of all three capacitors are identical, and the protective system has been shown in detail only for the capacitor 9, it being understood that the same system is provided for each of the other two capacitors, as shown diagrammatically.

The protective system 12 includes a main protective spark gap device 13, which is connected in a by-pass circuit 14 across the series capacitor 9. The spark gap device 13 may be any suitable type of gap device which is capable of maintaining a stable arc which restrikes promptly after each current zero, and which is not damaged by the heating resulting from continued arcing. The gap device is preferably of a type having massive carbon electrodes, and is shown diagrammatically as being of the type disclosed and claimed in a copending application of J. B. Owens, Serial No. 631,397, filed November 28, 1945, now Patent No. 2,462,219, issued February 22, 1949, and assigned to the Westinghouse Electric Corporation. A gap device of this type has a hollow upper electrode and a cylindrical lower electrode extending up into the upper electrode, so that the arc is confined within the electrodes and is positioned so that the magnetic forces acting on it tend to keep it centered between the electrodes. Such a gap is capable of maintaining a continued discharge without damage and without permitting excessive voltage peaks to occur.

The by-pass circuit 14 also includes a circuit breaker 15 connected in series with the gap device 13. The circuit breaker 15 is normally closed and is shown as having a trip coil 16 and a closing coil 17. The circuit breaker 15 has an auxiliary contact 18, connected in series with the trip coil 16, which is closed when the breaker is closed, and it has auxiliary contacts 19 and 20 which are open when the breaker is closed. A damping resistor 21 may also be connected in series in the by-pass circuit 14, if desired, to limit the magnitude of the discharge current from the capacitor 9, which flows in the by-pass circuit 14 when the gap 13 breaks down, and to damp the oscillations of the capacitor discharge current.

The circuit breaker 15 is controlled by means of a current-responsive relay 22 and a latch-type relay 23. The current relay 22 has an operating coil 24 which is energized in response to the current in the by-pass circuit 14 by means of a current transformer 25. The relay 22 has a movable contact member 26 which bridges stationary contacts 27 when the relay is in its deenergized position, shown in the drawing, and which bridges stationary contacts 28 when the relay is energized. The latch-type relay 23 may be of any suitable type which is adapted to close its contact 29 when its operating coil 30 is energized and which is latched, or otherwise held, in the energized position until it is released. A reset coil 31 is shown for releasing the relay 23. The operating coil 30 of the latching relay 23 is connected in series with the normally open contacts 28 of the relay 22. The normally closed contacts 27 of the relay 22 and the contact 29 of the relay 23 are connected in series to the trip coil 16 of the circuit breaker 15. The reset coil 31 of the relay 23 is connected to the auxiliary contact 19 of the circuit breaker 15.

The operation of the protective system, as so far described, is as follows. Under normal conditions, the circuit breaker 15 is closed to connect the main spark gap device 13 directly across the series capacitor, and the relays 22 and 23 are in their deenergized positions, as shown in the drawing. Upon the occurrence of a fault on the transmission line, or other excess-current condition, the voltage across the series capacitor 9 rises, and the spark gap device 13 breaks down when the voltage reaches the value for which it is set, which may, for example, be of the order of 200% of the normal full load voltage across the capacitor 9. As soon as the gap 13 breaks down and by-passes the capacitor 9, the fault current flows through the by-pass circuit 14, and the capacitor 9 is thus protected against the over-voltage which would otherwise occur across it. The heavy fault current flowing in the by-pass circuit 14 energizes the coil 24 of the relay 22, through the current transformer 25, and causes the relay to pick up, closing the contacts 28 and opening the contacts 27. When the contacts 28 close, a circuit is completed for energizing the coil 30 of the latching relay 23, which picks up and closes its contact 29 and is latched in that position.

As soon as the fault occurs, the protective devices of the transmission line operate to clear it, usually by switching out the faulted line section and then reclosing the line circuit breakers. When the faulted line section is switched out, or the fault is otherwise cleared, the current in the by-pass circuit 14 decreases, and when it falls below a predetermined value for which the relay 22 is set, which may be of the order of the normal full load current or somewhat higher, the relay 22 drops out and closes its contacts 27. It will be seen that this completes a circuit through the contact 29 of the latching relay 23 to the trip coil 16 of the circuit breaker 15 and trips the breaker to cause it to open. The breaker 15 is preferably designed so as to open very rapidly after energization of the trip coil 16, and thus the by-pass circuit is interrupted within a few cycles after the fault has been cleared to restore the capacitor to service, so that it will be available to assist in maintaining stability during the critical transient conditions immediately following the fault.

When the circuit breaker 15 opens, the auxiliary contact 20 completes a circuit for energizing the closing coil 17, so that the breaker is immediately reclosed as soon as it has opened, to again connect the gap 13 directly across the capacitor. The auxiliary contact 19 of the circuit breaker 15 completes a circuit to energize the reset coil 31 of the latching relay 23 as soon as the breaker opens, so that the relay 23 is allowed to drop out to its deenergized position in readiness for another operation.

Thus, the protective system operates to by-pass the series capacitor substantially instantaneously upon the occurrence of a fault, or other excess-current, and to interrupt the by-pass circuit and restore the capacitor to service very rapidly after the fault has been cleared.

The circuit breaker 15 is preferably designed so that it operates very rapidly, and its operation will usually be faster than that of the line breakers, so that the breaker 15 will normally reclose before the breakers of the faulted line section reclose. If, for any reason, the breaker 15 should not complete its closing movement until after the line breakers have reclosed, and if the fault is still in existence, or if a second fault should occur on another line section during the short time that the breaker is open, the capacitor 9 might be damaged, since it would be unprotected while the breaker 15 is open. To prevent this possibility, an auxiliary spark gap 32 is connected across the breaker 15. The gap 32 is preferably of the same type as the main spark gap 13, but may be set to have a lower breakdown voltage. A resistor 33 is preferably connected across the gap 32.

It will be seen that when the circuit breaker 15 is open, the gap 32 and resistor 33 are in the by-pass circuit in series with the main gap 13, and because of the presence of the resistor 33 substantially all the voltage across the series capacitor is applied to the gap 13. If an excess voltage appears across the capacitor 9 while the breaker 15 is open, therefore, the gap 13 will break down. The current in the by-pass circuit will then cause a high voltage drop across the resistor 33 which will break down the gap 32 to protect the capacitor. As soon as the breaker 15 completes its closing operation, of course, it short-circuits the gap 32 and extinguishes the arc in it, so that the current is transferred to the breaker 15 in the main by-pass circuit. The subsequent operations of tripping and reclosing the breaker, when the current decreases to the predetermined value, then follow as described above. It will be understood that the resistor 33 is not necessarily essential, since the gap 32 alone may be connected across the breaker 15 to provide protection while the breaker is open, but it is preferred to use the resistor 33 to obtain a lower breakdown voltage, which will be essentially that of the gap 13. If the resistor were not used, the capacitor 9 would not be protected until the voltage across it reached the combined breakdown voltages of the two gaps 13 and 32.

It may sometimes happen that the gap device 13 will be flashed over by a momentary voltage surge, such as a lightning surge or a switching transient, under normal current conditions, and if this occurs, the gap 13 may continue to arc but the breaker 15 would not be operated, since normal line current flowing in the by-pass circuit 14 would not be high enough to actuate the relay 22. Thus, the capacitor 9 would be by-passed, and the gap 13 might be damaged by long-continued arcing. To avoid this undesirable condition, a slow-acting relay 34 is provided. This relay has been shown as a time delay relay, as indicated diagrammatically by the dashpot 35, but it is to be understood that it is not necessarily provided with a definite time delay means but may be any suitable type of relay which operates more slowly than the relay 22. The slow-acting relay 34 has a coil 36 which is energized from the current transformer 25, and which may be connected either in series with the coil 24 of the relay 22, as shown, or in parallel with the coil 24. The relay 34 has a normally open contact 37 which is connected in series with the coil 30 of the latching relay 23.

If the gap 13 should arc over on a momentary voltage surge and continue arcing under normal current conditions, with a current in the by-pass circuit 14 which is too low to operate the relay 22, the relay 34, which is adjusted to respond to a considerably lower current than the relay 22, will pick up and close its contact 37, if the current flow in the by-pass circuit 14 continues for more than a relatively short time. When the relay 34 picks up and closes its contact 37, a circuit is completed for energizing the coil 30 of the latching relay 23, which picks up and closes its contact 29. Since the contacts 27 of the relay 22 are closed at this time, closing of the latching relay contact 29 completes the tripping circuit and energizes the trip coil 16 of the circuit breaker 15 to trip the breaker and interrupt the by-pass circuit, thus extinguishing the arc in the gap 13. The breaker is then reclosed and the latching relay 23 reset in the manner previously described.

It should now be apparent that a protective system has been provided for series capacitors connected in high-voltage, synchronous transmission systems, for the purpose of increasing the stability limits of the system, which operates to effectively protect the capacitor from over-voltages, and which also operates to restore the capacitor to serve very rapidly after a fault has been cleared, so that the capacitor is available to assist in maintaining stability during the transient conditions immediately following the fault when the stability problem is most critical, and the series capacitor is most needed. It will be understood, of course, that various modifications may be made, within the scope of the invention, and that other control or protective features may be added, if necessary or desirable. Thus, a by-pass circuit breaker 38 may be connected across the capacitor 9, and controlled either manually or automatically in any desired manner to remove the capacitor from service when it is desired to do so. The slow-acting relay 34 may be omitted, if desired, although it is usually a desirable feature.

A preferred embodiment of the invention has been shown and described, for the purpose of illustration, but it will be understood that the invention is not limited to the particular details and arrangement shown, but in its broadest aspects it includes all equivalent embodiments and modifications which come within the scope of the appended claims.

We claim as our invention:

1. A series capacitor installation for an alternating current line, comprising a capacitor, means for connecting said capacitor in series in the line, a spark gap device connected across the capacitor and adapted to break down and by-pass the capacitor under excess-current conditions, a normally-closed circuit breaker connected in series with said spark gap device, an auxiliary spark gap device connected directly across said circuit breaker so as to be in series with the first-mentioned spark gap device, means responsive to current flowing through the first-mentioned spark gap device for effecting opening of the circuit breaker after said current has fallen below a predetermined value, and means for immediately thereafter effecting reclosing of the circuit breaker.

2. A series capacitor installation for an alternating current line, comprising a capacitor, means for connecting said capacitor in series in the line, a spark gap device connected across the capacitor and adapted to break down and by-pass the capacitor under excess-current conditions, a normally-closed circuit breaker connected in series with said spark gap device, an auxiliary spark gap device connected directly across said circuit breaker so as to be in series with the first-mentioned spark gap device, a resistor connected across the auxiliary spark gap device, means responsive to current flowing through the first-mentioned spark gap device for effecting opening of the circuit breaker after said current has fallen below a predetermined value, and means for immediately thereafter effecting reclosing of the circuit breaker.

3. A series capacitor installation for an alternating current line, comprising a capacitor, means for connecting said capacitor in series in the line, a spark gap device connected in a by-pass circuit around the capacitor and adapted to break down and complete the by-pass circuit under excess-current conditions, a normally-closed circuit breaker connected in series in said by-pass circuit, a first relay responsive to current in the by-pass circuit, a second relay adapted when energized to prepare a tripping circuit for said circuit breaker and to remain in energized position, said first relay being adapted to effect energization of the second relay in response to current in the by-pass circuit in excess of a predetermined value and being adapted to complete said tripping circuit to effect opening of the circuit breaker when the current in the by-pass circuit falls below a lower predetermined value, and means for immediately thereafter effecting reclosing of the circuit breaker and restoring the second relay to non-energized position.

4. A series capacitor installation for an alternating current line, comprising a capacitor, means for connecting said capacitor in series in the line, a spark gap device connected in a by-pass circuit around the capacitor and adapted to break down and complete the by-pass circuit under excess-current conditions, a normally-closed circuit breaker connected in series in said by-pass circuit, an auxiliary spark gap device connected directly across said circuit breaker so as to be in series with the first-mentioned spark gap device, relay means responsive to current in the by-pass circuit, said relay means being adapted to effect preparation of a tripping circuit for said circuit breaker in response to current in the by-pass circuit in excess of a predetermined value and being adapted to complete said tripping circuit to effect opening of the circuit breaker when the current in the by-pass circuit falls below a lower predetermined value, and means for immediately thereafter effecting reclosing of the circuit breaker.

5. A series capacitor installation for an alternating current line, comprising a capacitor, means for connecting said capacitor in series in the line, a spark gap device connected in a by-pass circuit around the capacitor and adapted to break down and complete the by-pass circuit under excess-current conditions, a normally-closed circuit breaker connected in series in said by-pass circuit, an auxiliary spark gap device connected directly across said circuit breaker so as to be in series with the first-mentioned spark gap device, a resistor connected across said auxiliary spark gap device, relay means responsive to current in the by-pass circuit, said relay means being adapted to effect preparation of a tripping circuit for said circuit breaker in response to current in the by-pass circuit in excess of a predetermined value and being adapted to complete said tripping circuit to effect opening of the circuit breaker when the current in the by-pass circuit falls below a lower predetermined value, and means for immediately thereafter effecting reclosing of the circuit breaker.

6. A series capacitor installation for an alternating current line, comprising a capacitor, means for connecting said capacitor in series in the line, a spark gap device connected in a by-pass circuit around the capacitor and adapted to break down and complete the by-pass circuit under excess-current conditions, a normally-closed circuit breaker connected in series in said by-pass circuit, an auxiliary spark gap device connected across said circuit breaker, relay means responsive to current in the by-pass circuit, said relay means being adapted to effect preparation of a tripping circuit for said circuit breaker in response to current in the by-pass circuit in excess of a predetermined value and being adapted to complete said tripping circuit to effect opening of the circuit breaker when the current in the by-pass circuit falls below a lower predetermined value, slow-acting relay means for effecting opening of the circuit breaker in response to continued current flow in the by-pass circuit below the value required to actuate the first-mentioned relay means, and means for effecting reclosing of the circuit breaker immediately after it opens.

RALPH E. MARBURY.
HENRY A. TRAVERS.

REFERENCES CITED

The following references are of record in the file of this patent:

UNITED STATES PATENTS

| Number | Name | Date |
| --- | --- | --- |
| 2,072,717 | Marbury | Mar. 2, 1937 |
| 2,144,503 | Marbury | Jan. 17, 1939 |
| 2,345,590 | Evans et al. | Apr. 4, 1944 |
| 2,351,986 | Ludwig et al. | June 20, 1944 |
| 2,389,007 | Strang et al. | Nov. 13, 1945 |

FOREIGN PATENTS

| Number | Country | Date |
| --- | --- | --- |
| 428,546 | Germany | May 10, 1926 |
| 161,163 | Switzerland | June 16, 1933 |